United States Patent
Ashida

(10) Patent No.: US 12,489,993 B2
(45) Date of Patent: Dec. 2, 2025

(54) PHOTOELECTRIC CONVERSION DEVICE, PHOTOELECTRIC CONVERSION SYSTEM, EQUIPMENT, AND MOVING BODY

(71) Applicant: CANON KABUSHIKI KAISHA, Tokyo (JP)

(72) Inventor: Jumpei Ashida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 18/461,830

(22) Filed: Sep. 6, 2023

(65) Prior Publication Data
US 2024/0089636 A1   Mar. 14, 2024

(30) Foreign Application Priority Data
Sep. 13, 2022   (JP) .................. 2022-145573

(51) Int. Cl.
*H04N 25/47*   (2023.01)
*H04N 25/79*   (2023.01)

(52) U.S. Cl.
CPC ............. *H04N 25/47* (2023.01); *H04N 25/79* (2023.01)

(58) Field of Classification Search
CPC ....... H04N 25/47; H04N 25/79; H04N 25/773
See application file for complete search history.

(56) References Cited

U.S. PATENT DOCUMENTS

| | | |
|---|---|---|
| 2020/0091214 A1 | 3/2020 | Ikeda |
| 2020/0195875 A1* | 6/2020 | Berkovich ........... G06V 10/764 |
| 2020/0321374 A1* | 10/2020 | Ion ........................... G06N 3/04 |
| 2021/0152757 A1* | 5/2021 | Wakabayashi ......... G06V 10/22 |
| 2022/0400222 A1 | 12/2022 | Nakagawa |
| 2022/0408036 A1 | 12/2022 | Ashida et al. |
| 2023/0179751 A1 | 6/2023 | Ashida |
| 2023/0282672 A1 | 9/2023 | Tsuboi et al. |

FOREIGN PATENT DOCUMENTS

| | | |
|---|---|---|
| JP | 2020-150556 A | 9/2020 |
| JP | 2021-093563 A | 6/2021 |
| JP | 2022-054553 A | 4/2022 |

OTHER PUBLICATIONS

T. Finateu et al., "A 1280×720 Back-Illuminated Stacked Temporal Contrast Event-Based Vision Sensor with 4.86μm Pixels, 1.066GEPS Readout, Programmable Event-Rate Controller and Compressive Data-Formatting Pipeline." IEEE International Solid-State Circuits Conference, pp. 112-114 (2020).

* cited by examiner

*Primary Examiner* — Daniel M Pasiewicz
(74) *Attorney, Agent, or Firm* — Venable LLP

(57) ABSTRACT

A photoelectric conversion device is provided. The device includes a plurality of pixels each including a photoelectric conversion element, a plurality of calculators, and a processor. The plurality of pixels and the plurality of calculators are respectively arranged in a two-dimensional array. For the plurality of pixels, each pixel group of pixel groups composed of not less than two pixels of the plurality of pixels is connected to a corresponding calculator of the plurality of calculators, and each pixel group outputs a spiking signal generated by a pixel in a pixel group of the pixel groups to the corresponding calculator of the plurality of calculators. Each of the plurality of calculators executes calculation for the spiking signal, and the processor processes a calculation result input from each of the plurality of calculators.

17 Claims, 11 Drawing Sheets

PHOTOELECTRIC CONVERSION DEVICE, PHOTOELECTRIC CONVERSION SYSTEM, EQUIPMENT, AND MOVING BODY

BACKGROUND OF THE INVENTION

Field of the Invention

The present invention relates to a photoelectric conversion device, a photoelectric conversion system, equipment, and a moving body.

Description of the Related Art

Along with the recent spread of IoT, AI, automated driving, and the like, there is a demand for a high-speed image sensor with less power consumption. T. Finateu et al., "A 1280×720 Back-Illuminated Stacked Temporal Contrast Event-Based Vision Sensor with 4.86 µm Pixels, 1.066GEPS Readout, Programmable Event-Rate Controller and Compressive Data-Formatting Pipeline." 2020 IEEE International Solid-State Circuits Conference, pp. 112-114 (2020) (to be referred to as Finateu hereinafter) describes an event-based sensor that monitors a change in light amount in respective pixels arranged in a two-dimensional array, and outputs a signal if a change is detected. According to Finateu, since the event-based sensor outputs a signal only when a change in light amount occurs, a high-speed operation with low power consumption can be implemented.

SUMMARY OF THE INVENTION

In the configuration according to Finateu, if a change in light amount is detected, a transfer circuit for each pixel outputs a request signal to an arbitration circuit, and the arbitration circuit selects a readout target row. However, since signal readout is performed for each row, if the request signals are output from the pixels in two or more rows, some pixel is made to wait until the signal is read out. For example, assume that it takes 1 µs to read out signals from one row, the sensor is mounted on a moving body or the like, and many pixels have detected a change in light amount. In this case, when there are 720 rows, a delay time of about 1 ms at maximum occurs. Even if the time resolution of the time stamp, which is added in correspondence with the detection of a change in light amount in the pixel, is a high time resolution of 1 µs or the like, the time resolution of the signal read out in practice is substantially 1 ms. This difference in time resolution can cause an artifact, so that an object which is actually straight is observed to be curved. Further, if a next change in light amount occurs in the same pixel before the signal is read out, the preceding signal may disappear.

Some embodiments of the present invention provide a technique advantageous in improving the performance of a photoelectric conversion device.

According to some embodiments, a photoelectric conversion device that comprises a plurality of pixels each including a photoelectric conversion element, a plurality of calculators, and a processor, wherein the plurality of pixels and the plurality of calculators are respectively arranged in a two-dimensional array, for the plurality of pixels, each pixel group of pixel groups composed of not less than two pixels of the plurality of pixels is connected to a corresponding calculator of the plurality of calculators, each pixel group is configured to output a spiking signal generated by a pixel in a pixel group of the pixel groups to the corresponding calculator of the plurality of calculators, each of the plurality of calculators is configured to execute calculation for the spiking signal, and the processor is configured to process a calculation result input from each of the plurality of calculators, is provided.

According to some other embodiments, a photoelectric conversion device that comprises a plurality of pixels each including a photoelectric conversion element, and a plurality of calculators, wherein the plurality of pixels and the plurality of calculators are respectively arranged in a two-dimensional array, for the plurality of pixels, each pixel group of pixel groups composed of not less than two pixels of the plurality of pixels is connected to a corresponding calculator of the plurality of calculators, each pixel group is configured to output a spiking signal generated by a pixel in a pixel group of the pixel groups to the corresponding calculator of the plurality of calculators in accordance with a change of a signal output from the photoelectric conversion element, and each of the plurality of calculators is configured to execute calculation for the spiking signal, is provided.

Further features of the present invention will become apparent from the following description of exemplary embodiments (with reference to the attached drawings).

DESCRIPTION OF THE EMBODIMENTS

Figure 1:
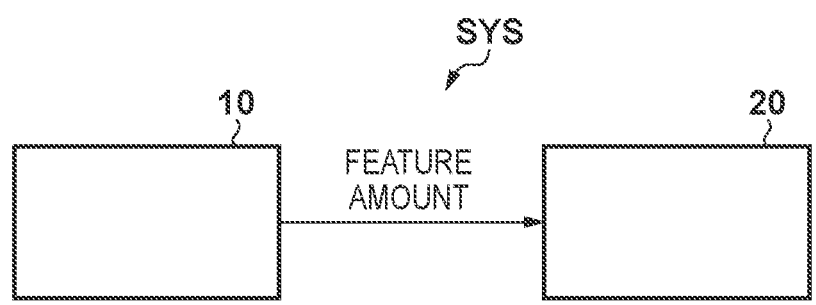
FIG. 1 is a view showing a configuration example of a photoelectric conversion system including a photoelectric conversion device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

With reference to FIGS. 1 to 8, a photoelectric conversion device and a photoelectric conversion system according to an embodiment of this disclosure will be described. FIG. 1 is a view showing a configuration example of a photoelectric conversion system SYS according to this embodiment. The photoelectric conversion system SYS includes a photoelectric conversion device 10 and a calculation device 20. The photoelectric conversion device 10 executes predetermined calculation for signals detected in a plurality of pixels each including a photoelectric conversion element, thereby acquiring a signal representing the feature amount of an image (video) corresponding to light entering the photoelectric conversion device 10. The calculation device 20 receives the signal representing the feature amount from the photoelectric conversion device 10, and further executes predetermined calculation. The calculation device 20 performs, for example, a recognition process to obtain the position and optical flow of a target object. Such the photoelectric conversion system SYS can also be called a vision system. For example, the photoelectric conversion system SYS can be mounted on an autonomous moving body such as a drone, and used to detect an obstacle or create a map (Simultaneous Localization And Mapping (SLAM)). The photoelectric conversion system SYS may also be used for in-vehicle use in an automobile or the like, and can be used to detect pedestrians and other vehicles. The calculation device 20 may be incorporated equipment such as an Application Specific Integrated Circuit (ASIC), a Field-Programmable Gate Array (FPGA), or a Graphics Processing Unit (GPU). The calculation device 20 may also be a Personal Computer (PC) or cloud computing. The photoelectric conversion device 10 and the calculation device 20 need not be separated as shown in FIG. 1. For example, the photoelectric conversion device 10 and the calculation device 20 may be mounted on the same chip.

Figure 2:
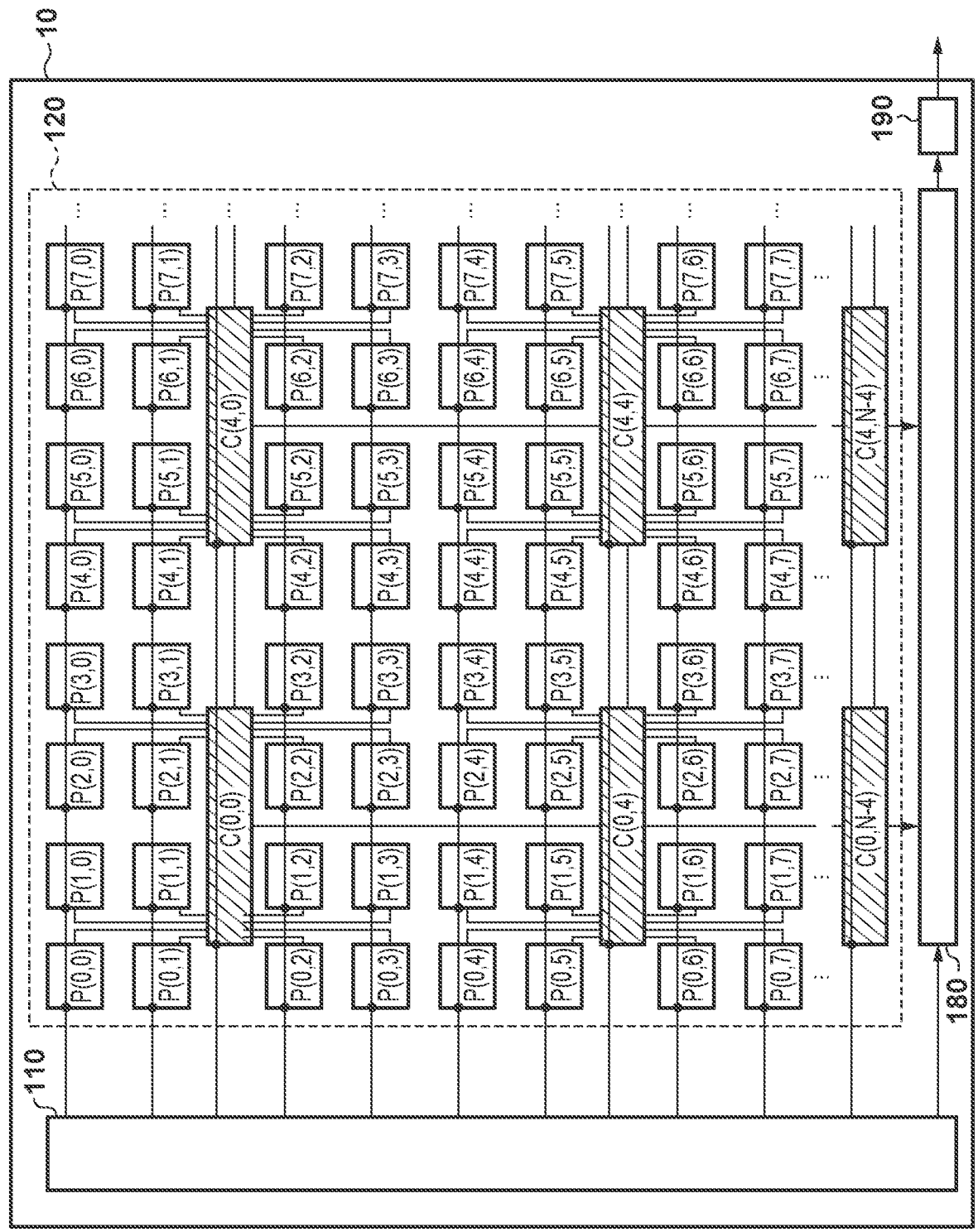
FIG. 2 is a view showing an arrangement example of the photoelectric conversion device shown in FIG. 1.

With reference to FIG. 2, an example of the circuit arrangement of the photoelectric conversion device 10 will be described. The photoelectric conversion device 10 includes a controller 110, a pixel/calculator 120, a processor 180, and an output IF unit 190. The controller 110 controls operations of the pixel/calculator 120 and the processor 180. In the pixel/calculator 120, a plurality of pixels P each including a photoelectric conversion element, and a plurality of calculators C are arranged. The plurality of pixels P and the plurality of calculators C are respectively arranged in a two-dimensional array as shown in FIG. 2. The plurality of pixels P and the plurality of calculators C may be arranged in the same substrate. Alternatively, the photoelectric conversion device 10 may have a stacked structure obtained by stacking a substrate in which at least photoelectric conversion elements of the plurality of pixels P are arranged, and a substrate in which the plurality of calculators C are arranged.

In the arrangement shown in FIG. 2, M×N pixels P are arranged in the pixel/calculator 120. When indicating a specific pixel P among the pixels P, it is indicated as the pixel P(m, n). m is an integer that satisfies 0≤m≤(M−1), and n is an integer that satisfies 0≤n≤(N−1). Here, M pixels P are arranged in a row direction (the horizontal direction in FIG. 2), and N pixels P are arranged in a column direction (the vertical direction in FIG. 2).

One calculator C is arranged for each predetermined number pixels P. For the plurality of pixels P, it can also be said that each pixel group composed of two or more pixels P of the plurality of pixels P is connected to the corresponding calculator C of the plurality of calculators C. For example, in the arrangement shown in FIG. 2, one calculator C is arranged for the pixel group composed of 4×4 pixels P. When indicating a specific calculator C among the calculators C, it is indicated as the calculator C (m', n'). In the arrangement shown in FIG. 2, each of m' and n' is a multiple of 4. As shown in FIG. 2, the pixel P is directly connected to the corresponding calculator C. In other words, another component such as a readout mechanism including a transfer circuit and an arbitration circuit described in Finateu may not be arranged between the pixel P and the calculator C.

In addition to the pixels P included in the corresponding pixel group, the calculator C is also connected to the calculator C arranged adjacent thereto, so that they can exchange data. That is, the calculator C(m', n') is also connected to the calculators C(m'−4, n'), C(m', n'−4), C(m'+4, n'), and C(m', n'+4). The calculator C executes predetermined calculation for the signal input from the pixel P and the signal (data) input from the adjacent calculator C. In addition, the calculator C can transmit the calculation result to the adjacent calculator C. The calculator C (m', N−4) arranged at the end of the pixel/calculator 120 can output the calculation result to the processor 180.

The processor 180 performs a process such as predetermined calculation for the calculation result input from each of the plurality of calculators C. Further, the processor 180 outputs the processing result to the outside of the photoelectric conversion device 10, such as the calculation device 20, via the output IF unit 190. In this manner, with the configuration in which the signals of the pixels P are directly output to the calculator C for each pixel group, the signal generated in each pixel P can be processed with little delay time without being rate-limited (without congestion) by the readout mechanism including the transfer circuit and the arbitration circuit as described in Finateu.

Next, the pixel P will be described. In this embodiment, each pixel P detects a change in light amount of incident light, and outputs a spiking signal. More specifically, each of the plurality of pixels P outputs a spiking signal in accordance with a change of a signal output from the photoelectric conversion element. Since the pixel P outputs the signal in accordance with a change (event) in light amount of incident light, this spiking signal can also be called an event signal. Each of the plurality of pixels P outputs the spiking signal, as the event signal, to the connected calculator C of the plurality of calculators C, and each of the plurality of calculators C executes calculation for the spiking signal. Here, the spiking signal can be, for example, a pulse-like signal. Alternatively, the spiking signal may be, for example, a signal in which the rise and fall of a pulse are observed, for example, a signal having a sinusoidal shape.

Figure 3:
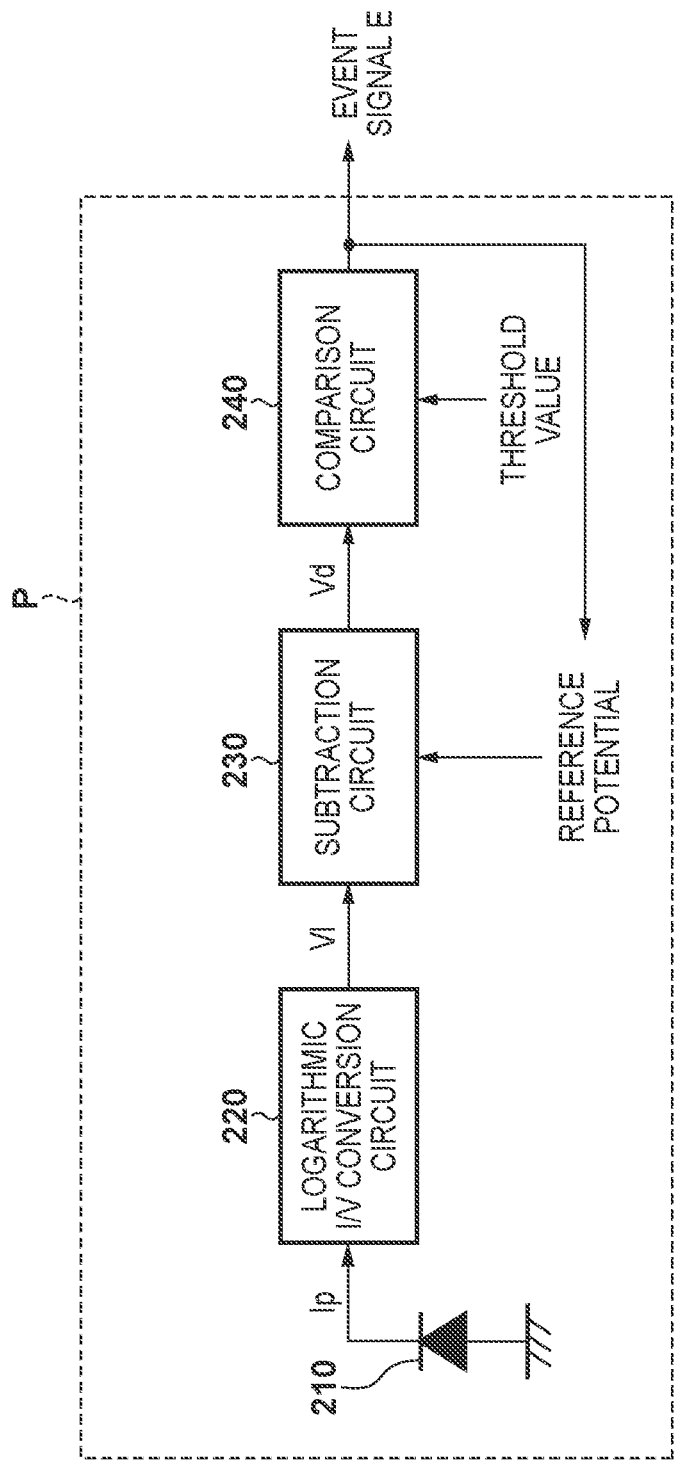
FIG. 3 is a view showing an arrangement example of a pixel of the photoelectric conversion device shown in FIG. 1.

For example, the pixel P can be formed by a circuit shown in FIG. 3. In the arrangement shown in FIG. 3, the pixel P includes a photodiode 210, a logarithmic I/V conversion circuit 220, a subtraction circuit 230, and a comparison circuit 240. The photodiode 210 serving as the photoelectric conversion element generates a photocurrent $I_p$ corresponding to the light amount of incident light. The logarithmic I/V conversion circuit 220 converts the photocurrent $I_p$ into a potential and applies a logarithmic transformation, thereby generating a logarithmic potential $V_1$. Since the main purpose of the logarithmic transformation is to expand the dynamic range, the logarithmic transformation may not be applied. That is, it is only required that the potential corresponding to the photocurrent $I_p$ generated by the photodiode

210 is generated between the photodiode 210 and the subtraction circuit 230. The subtraction circuit 230 generates a subtraction value $V_d$ by subtracting a reference potential (reference value) from the logarithmic potential $V_1$ corresponding to the signal value of the signal (photocurrent $I_p$) output from the photodiode. The comparison circuit 240 compares the subtraction value $V_d$ with a predetermined threshold value. Two threshold values including a positive threshold value T1 and a negative threshold value T2 are used. If the subtraction value $V_d$ is larger than the positive threshold value T1, or if the subtraction value $V_d$ is smaller than the negative threshold value T2, the comparison circuit 240 (pixel P) outputs an event signal E. The event signal E of the pixel P(m, n) at time t is expressed by:

$$E(m, n, t) = \begin{cases} 1 (v_d > T1) \\ -1 (v_d < T2) \\ 0 (T1 \geq v_d \geq T2) \end{cases} \quad (1)$$

In the photoelectric conversion device 10, the resolution of the time t is, for example, 1 µs. The event signal E has a high time resolution since this signal is generated irrespective of (asynchronously with) a frame synchronization signal which is used in a normal image sensor. The event signal E is output from the pixel P to the calculator C corresponding to each pixel P. The event signal E is also used to update the reference potential. That is, the logarithmic potential $V_1$ used when outputting the event signal E is held and used as the next reference potential. With the arrangement described above, an increase/decrease in amount of light entering the photodiode 210 serving as the photoelectric conversion element can be output as the spiking event signal E.

As has been described above, the photoelectric conversion device 10 can be implemented as a single-layer sensor including one substrate, or a stacked sensor including two or more substrates. When forming the stacked sensor, for example, the photodiode 210 serving as the photoelectric conversion element may be arranged in the substrate different from the substrate in which the subtraction circuit 230 and the comparison circuit 240 are arranged. In this case, a part of the logarithmic I/V conversion circuit 220 may be arranged in the substrate with the photodiode 210 arranged therein, and the remaining part of the logarithmic I/V conversion circuit 220 may be arranged in the substrate with the subtraction circuit 230 and the comparison circuit 240 arranged therein. Further, in this case, the calculator C may be arranged in the substrate with the subtraction circuit 230 and the comparison circuit 240 arranged therein, or may be arranged in still another substrate.

Figure 9A:
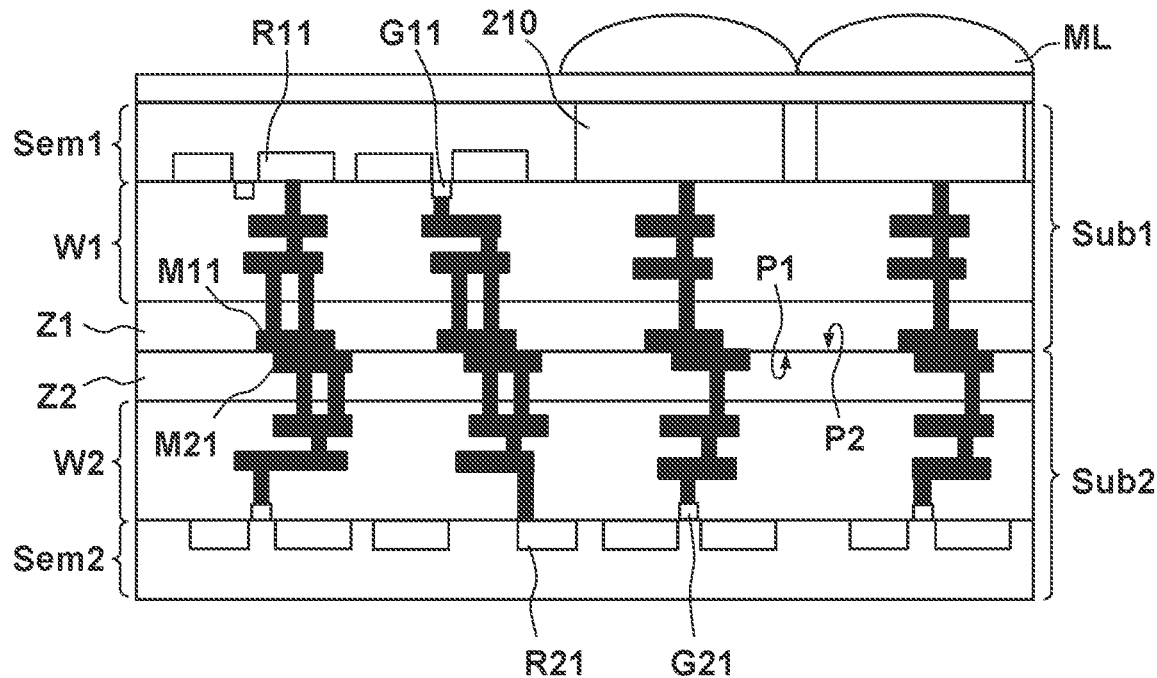
FIGS. 9A and 9B are views showing an arrangement example of the photoelectric conversion device shown in FIG. 1.

An example of a stacked sensor formed by stacking a plurality of substrates will be described with reference to FIGS. 9A and 9B. FIG. 9A is a view showing the arrangement of a stacked sensor. The photodiode 210 and various semiconductor regions R11 are provided in a semiconductor layer Sem1. The photodiode 210 receives the light transmitted through a microlens ML provided on the back surface side of the semiconductor layer Sem1, and performs photoelectric conversion. On the front surface side of the semiconductor layer Sem1, a structure W1 including a gate structure G11 of each transistor, a plurality of wiring layers, and a plurality of interlayer insulating films is provided. That is, the stacked sensor shown in FIG. 9A is formed as a back-side illumination sensor. Here, the microlens ML is not an essential component. A bonding layer Z1 is provided on the lower surface of the structure W1. Connection portions M11 made of a metal are provided in the bonding layer Z1. The connection portion M11 is typically made of one of copper (Cu), aluminum (Al), and tungsten (W), or a combination of some of these metals. The connection portion M11 is provided in the insulating film of the bonding layer Z1. A substrate Sub1 includes the semiconductor layer Sem1, the structure W1, and the bonding layer Z1.

Various semiconductor regions R21 forming various kinds of circuits are provided in a semiconductor layer Sem2. On the front surface side of the semiconductor layer Sem2, a structure W2 including a gate structure G21 of each transistor, a plurality of wiring layers, and a plurality of interlayer insulating films is provided. A bonding layer Z2 is provided on the upper surface of the structure W2. Connection portions M21 made of a metal are provided in the bonding layer Z2. The connection portion M21 is typically made of one of copper (Cu), aluminum (Al), and tungsten (W), or a combination of some of these metals. The connection portion M21 is provided in the insulating film of the bonding layer Z2. A substrate Sub2 includes the semiconductor layer Sem2, the structure W2, and the bonding layer Z2.

Figure 9B:
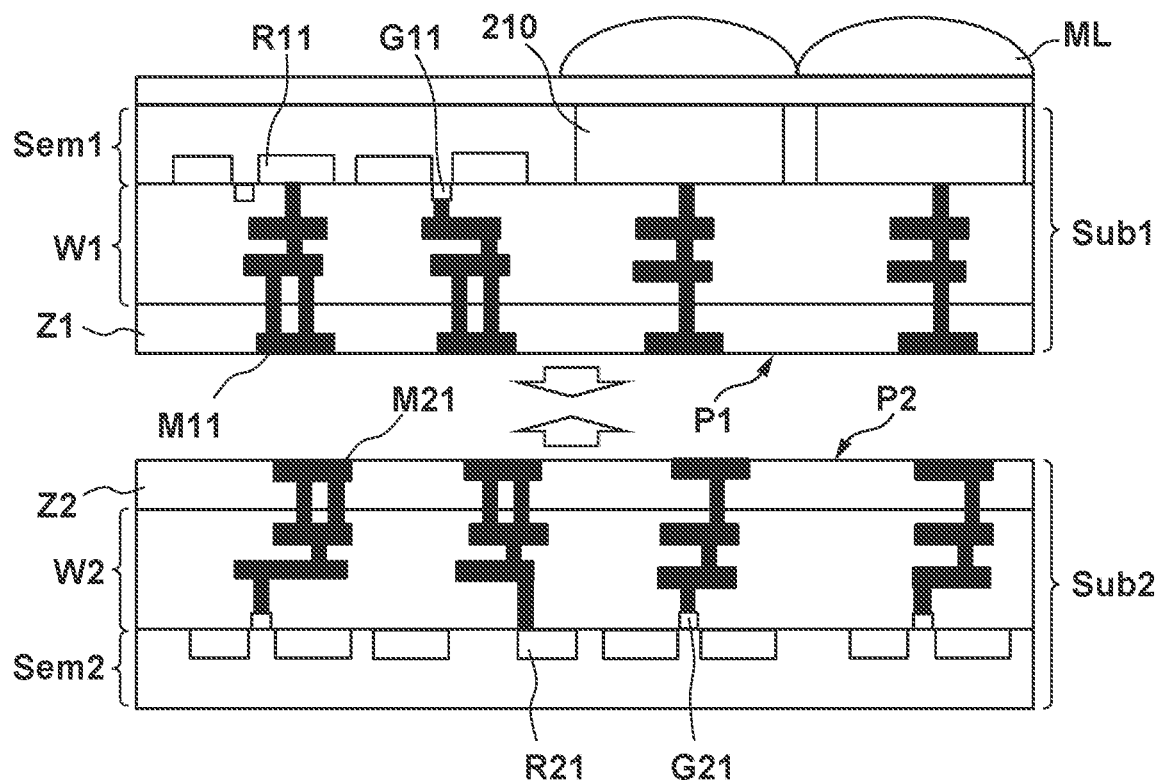

FIG. 9B shows a state before bonding the substrate Sub1 and the substrate Sub2. In the state before bonding, the connection portions M11 and M21 provided in the substrates Sub1 and Sub2, respectively, are connected to the wiring layer in the corresponding substrate. The wiring layer is connected to functional elements such as the transistor, a resistive element, a capacitive element, and the photodiode 210 in the corresponding substrate. Accordingly, in the state before bonding the substrates Sub1 and Sub2 to each other, the connection portions M11 and M21 in the multiple substrates Sub1 and Sub2, respectively, are connected to the functional elements in the corresponding substrate.

In a bonding surface P1 of the bonding layer Z1, the insulating film and the connection portions M11 provided by partially removing the insulating film are provided. Similarly, in a bonding surface P2 of the bonding layer Z2, the insulating film and the connection portions M21 provided by partially removing the insulating film are provided.

Then, the substrate Sub1 and the substrate Sub2 are bonded by bonding the bonding surface P1 and the bonding surface P2. That is, the substrate Sub1 and the substrate Sub2 are bonded by bonding the insulating film of the substrate Sub1 to the insulating film of the substrate Sub2, and bonding the connection portion (connection portion M11) of the substrate Sub1 to the connection portion (connection portion M21) of the substrate Sub2. Thus, the substrate Sub1 and the substrate Sub2 can be electrically connected.

The connection portions M11 described here may be provided such that one connection portion M11 is provided so as to correspond to each of the plurality of photodiodes 210. In this case, one connection portion M21 can be provided for each of the plurality of subtraction circuits 230. Alternatively, in this case, one connection portion M21 may be provided for two or more subtraction circuits 230 of the plurality of subtraction circuits 230. One connection portion M11 may be provided for two or more photodiodes 210 of the plurality of photodiodes 210. Also in this case, one connection portion M21 can be provided for each of the plurality of subtraction circuits 230, or one connection portion M21 can be provided for two or more subtraction circuits 230 of the plurality of subtraction circuits 230.

The bonding method described above is merely an example, and a plurality of substrates can be electrically connected by another bonding method. For example, a stacked body is formed by bonding a plurality of substrates in each of which an insulating film is provided in the bonding surface but no connection portion is provided therein. Then, from the upper surface of the stacked body, a first through hole extending up to the wiring layer of one substrate, and a second through hole extending up to the wiring layer of the other substrate are formed. Then, the first through hole and the second through hole are filled with a metal. A metal film that connects the metal filled in the first through hole and the metal filled in the second through hole is provided. This metal is typically one of copper (Cu), aluminum (Al), and tungsten (W), or a combination of some of these metals. Thus, the plurality of substrates can be electrically connected.

Figure 4:
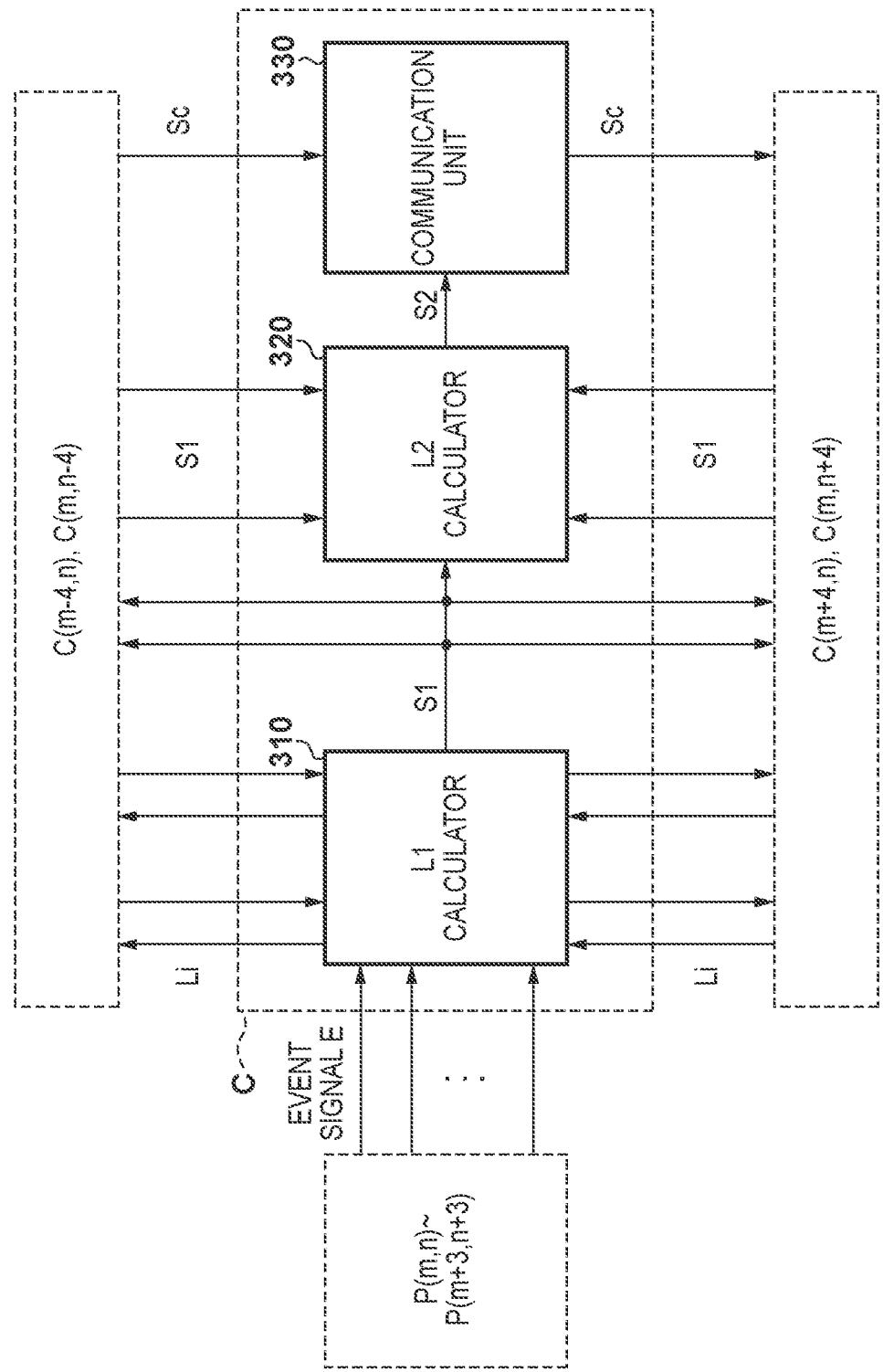
FIG. 4 is a view showing an arrangement example of a calculator of the photoelectric conversion device shown in FIG. 1.

Next, calculation executed in the calculator C will be described. In this embodiment, the calculator C can include a neural network. Further, in this embodiment, the calculator C can be configured to execute at least a part of the operation of a Convolutional Spiking Neural Network (CSNN). Each calculator C can be formed by, for example, a circuit as shown in FIG. 4. In the arrangement shown in FIG. 4, the calculator C includes an L1 calculator 310, an L2 calculator 320, and a communication unit 330.

The operation of the CSNN in each of the L1 calculator 310 and the L2 calculator 320 can be formed by a combination of a convolution operation, a Leaky Integrate and Fire (LIF) operation, and a pooling operation. An input to the L1 calculator 310 is the event signal E output from each pixel P connected to the calculator C. For the event signal E input to the L1 calculator 310, the L1 calculator 310 first executes a convolution operation with a predetermined kernel size (for example, 4×4 pixels) and a predetermined stride (for example, two pixels). For example, the convolution operation is expressed as:

$$F_s(t) = \Sigma_{i,j,k} w_{s,i,j,k} \times E(x+i, y+j, t-k) + b_s \quad (2)$$

where $w_{s,i,j,k}$ is a convolution kernel coefficient (weight), and $b_s$ is a bias term. Equation (2) includes multiplication. However, as has been described above, since the event signal E (m, n, t) is one of "−1", "0", and "1", the L1 calculator 310 can also be formed only by an adder/subtractor. Each of the kernel coefficient and the bias term may be set to an appropriate value at the time of design of the L1 calculator 310, or may be acquired by machine learning. s indicates the channel number of the L1 calculator 310. For example, 0≤s≤7 if there are eight channels. If the field of view of the kernel includes the pixel P not directly connected to the calculator C, the process can be executed while exchanging an intermediate result Li with the L1 calculator 310 of the adjacent calculator C. Fs(t) as the result of the convolution operation is the result of the convolution operation for a spiking signal. Therefore, Fs(t) becomes a spiking signal having height information.

Then, the LIF operation for the result of the convolution operation is executed for each channel. In the LIF operation, a membrane potential V(t) expressed by, for example, equation (3) is obtained.

$$\tau \frac{dV(t)}{dt} = (-V(t) + V_R) + F(t) \quad (3)$$

where $\tau$ is a time constant, and $V_R$ is a predetermined reset potential. That is, the membrane potential V(t) integrates the input F(t), and behaves so as to attenuate over time. If the membrane potential V(t) exceeds a predetermined fire threshold value, it fires, and this causes a spiking signal to be output. After generating the spiking signal, the membrane potential V(t) returns to the reset potential $V_R$. Here, the input F(t) is a spiking signal, and the height of the pulse is integrated when the spike rises. In other words, the pulse width of the spiking signal has no influence on the operation. Although the LIF operation is executed here, an adaptive-LIF (ALIF) operation may be used in which the fire threshold value is adaptively adjusted in accordance with past fire.

A MAX pooling operation with a predetermined kernel size (for example, 2×2 pixels) and a predetermined stride (for example, 2 pixels) is executed for the result of the LIF operation. Since the result of the LIF operation is spiking, the result of the MAX pooling operation is equivalent to the OR, and the output is also spiking. However, if a refractory period is provided, the spiking signal input from the LIF operation is ignored in the MAX pooling operation for a certain period after fire.

As a modification, by partially exchanging the processing order of the LIF operation and the MAX pooling operation, the MAX pooling operation may be executed for the membrane potential V(t), and the result may be compared with the fire threshold value to output a spiking signal. The pooling operation can be expected to improve the robustness against misalignment and reduce the amount of operation. However, the pooling operation is not essential, and may not be executed.

With the arrangement described above, the L1 calculator 310 outputs a calculation result S1. The spatial resolution (resolution) of the calculation result S1 becomes coarser than that of the event signal E due to the convolution operation and the pooling operation and, for example, becomes 1/16 that of the event signal E. In addition, the interval between the spiking signals is widened, and the time resolution becomes, for example, 1/10 that of the event signal E.

The calculation result S1 is sent to the L2 calculator 320 of the same calculator C, or the L2 calculator 320 of the adjacent calculator C. Similar to the L1 calculator 310, the L2 calculator 320 executes a convolution operation, a LIF operation, and a pooling operation, thereby obtaining a spiking calculation result S2. The spatial resolution and time resolution of the calculation result S2 become coarser than those of the calculation result S1. The calculation result S2 is sent to the communication unit 330.

The communication unit 330 is connected to the communication unit 330 of the adjacent calculator C in the column direction. In the lower end of the pixel/calculator 120, the communication unit 330 is connected to the processor 180. A calculation result Sc (the calculation result Sc may be, for example, the same as the calculation result S2, or may be obtained by adding data to the calculation result S2) output from the communication unit 330 is sent while being sequentially relayed to the calculator C close to the processor 180. Finally, the calculation result Sc of each calculator C is input to the processor 180. In this manner, each of the plurality of calculators C executes calculation based on the membrane potential corresponding to the received spiking event signal E, and the calculation result Sc is finally sent to the processor 180 outside the pixel/calculator 120. For example, the processor 180 may use the calculation result Sc to acquire a histogram as needed, or may execute a further operation of the CSNN.

With the arrangement as described above, from the event signal E having a high time resolution, an event feature amount such as a series of events in the time direction and the spatial direction can be extracted using the operation of the CSNN. The event feature amount obtained in this manner is used to perform, for example, a recognition process such object detection in the calculation device 20 at the subsequent stage. The recognition process such as object detection may be performed using a learned model that has learned the relationship between the event feature amount and the object position using, for example, a Convolutional Neural Network (CNN)-based machine learning method. Since it is based on information with a high time resolution, for example, it is possible to detect an object with high accuracy even when the object moving at high speed is to be detected.

The photoelectric conversion device 10 according to this embodiment does not have a concept such as a frame period which a normal sensor has, and extracts the event feature amount by asynchronously updating the state as needed. Accordingly, the delay from a change in light amount to extraction of the feature amount is shortened. Since the event signal E is usually detected only near the edge of a moving object, the event signal E is generated sparsely. Accordingly, the convolution operation and the like need be executed only when an event occurs. The photoelectric conversion device 10 having the arrangement described above can suppress the average power consumption to be low. In addition, since the event signal E output from the pixel P is directly input to the calculator C without intervening the readout mechanism including the transfer circuit and the arbitration circuit as described in Finateu, the event signal E is processed with a low delay without being rate-limited by the bandwidth of the readout mechanism or the like. That is, even if many event signals E are generated, they can be processed without any problem. Since the feature amount calculated and processed by the calculator C and the processor 180 has the spatial resolution and time resolution coarser than those of the event signal E, the information amount (number of bytes) can be low. Accordingly, even if the communication band of the output IF unit 190 is relatively narrow, the output IF unit 190 cab transmit the data to the calculation device 20, and the power consumption required for transmission can be reduced.

In this embodiment, the calculator C may be implemented using an analog calculator as long as an equivalent calculation result (including an approximate calculation result) can be obtained. Further, the calculator C may be implemented using an asynchronous (without a clock) digital calculator, or may be implemented using a clock synchronization digital calculator. Furthermore, the calculator C may be implemented by software by a processor. The calculator C may be a combination of these methods. It may be configured such that the calculator as described above is shared by a plurality of calculators C and used by time division.

In the pixel P and the calculator C, the order of executing the operations may be different from the order described above. For example, in the pixel P as shown in FIG. 3, subtracting the reference potential from the logarithmic potential $V_1$ is equivalent to adding the reference potential to the threshold value T1 or T2. In the L1 calculator 310 and the L2 calculator 320, the order of the convolution operation, the LIF operation, and the pooling operation may be any order. The number of convolution operations, LIF operations, and pooling operations may also be an arbitrary number. Recurrent coupling may be included within the CSNN.

Figure 5:
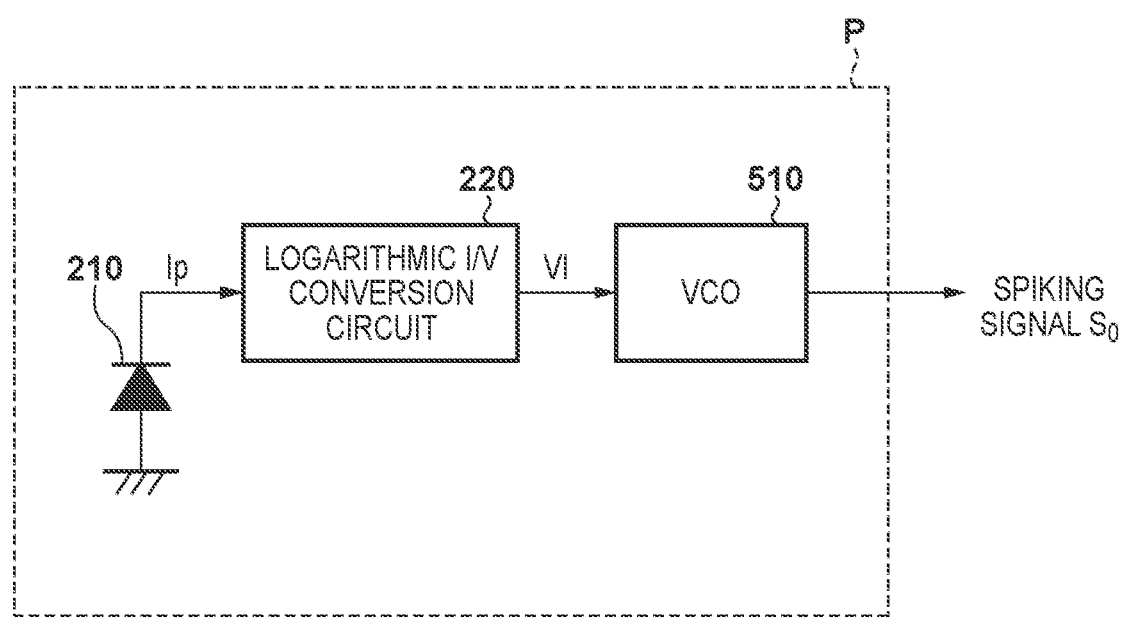
FIG. 5 is a view showing another arrangement example of the pixel of the photoelectric conversion device shown in FIG. 1.

In the embodiment described above, an example has been described in which calculation for the event signal E, which is obtained by asynchronously detecting a change in amount of light entering the photodiode 210 serving as the photoelectric conversion element, is executed by the CSNN. However, the arrangement of the pixel P is not limited to this. FIG. 5 is a view showing an arrangement example of the pixel P according this embodiment different from the arrangement example shown in FIG. 3. In the arrangement shown in FIG. 5, the logarithmic potential $V_1$ output from the logarithmic I/V conversion circuit 220 is input to a Voltage Controlled Oscillator (VCO) 510. The VCO 510 generates a spike signal $S_O$, which is a spiking (sinusoidal) signal train with a frequency corresponding to the logarithmic potential $V_1$. That is, each of the plurality of pixels P outputs a spiking signal at a frequency corresponding to the signal value of the signal output from the photodiode 210 serving as the photoelectric conversion element. The VCO 510 can be implemented using, for example, a ring oscillator in which three (odd number) inverters are connected in a ring. In the case of VCO 510, the pulse duty is about 50%. However, as has been described above, since the calculator C does not depend on the pulse width of the spiking signal, the signal output from the VCO 510 can be handled as equivalent to the event signal E described above.

Even when the VCO 510 is used for the pixel P, the process after the calculator C receiving the spike signal $S_O$ can be similar to that described above. In this embodiment, the feature amount based on the absolute value of the photocurrent generated by the photodiode 210 is extracted by the CSNN. By learning the relationship between the feature amount and the object position or the like using a CNN-based machine learning method, it is possible to perform a recognition process such as object detection as described above in the calculation device 20 at the subsequent stage. In addition, as in the embodiment described above, since the signal generated asynchronously is processed by the CSNN, the information with a high time resolution can be utilized. The arrangement of the pixel P including the VCO 510 can also detect a stationary object without a change in light amount.

A Single Photon Avalanche Diode (SPAD) element using an avalanche photodiode as a photoelectric conversion element may be used for the pixel P. The SPAD element utilizes avalanche multiplication to convert each photon into a spiking signal. Since the interval at which the spiking signal is output can depend on the light amount, a spiking signal train is generated as in the pixel P using the VCO 510 described above. This spiking signal train is input to the calculator C described above, and can be processed as described above. When a SPAD element is used for the pixel P, the photoelectric conversion system SYS capable of recognizing a target object even under low illuminance can be implemented.

In each embodiment described above, an example of processing the signal input from the pixel P by the CSNN has been described, but the calculator C may process the input signal by an Artificial Neural Network (ANN). Unlike the CSNN, the ANN is expressed by a differentiable equation, so that the ANN has a merit that highly accurate learning using an error backpropagation method or the like can be executed. On the other hand, synchronization is necessary because an asynchronous signal such as the event signal E described above cannot be handled. Due to synchronization, it is difficult to detect the event signal E with a high time resolution. However, depending on the object to be recognized or the application, it is possible to perform a recognition process such as object detection with high accuracy by using a learned model obtained by highly accurate learning.

Figure 6:
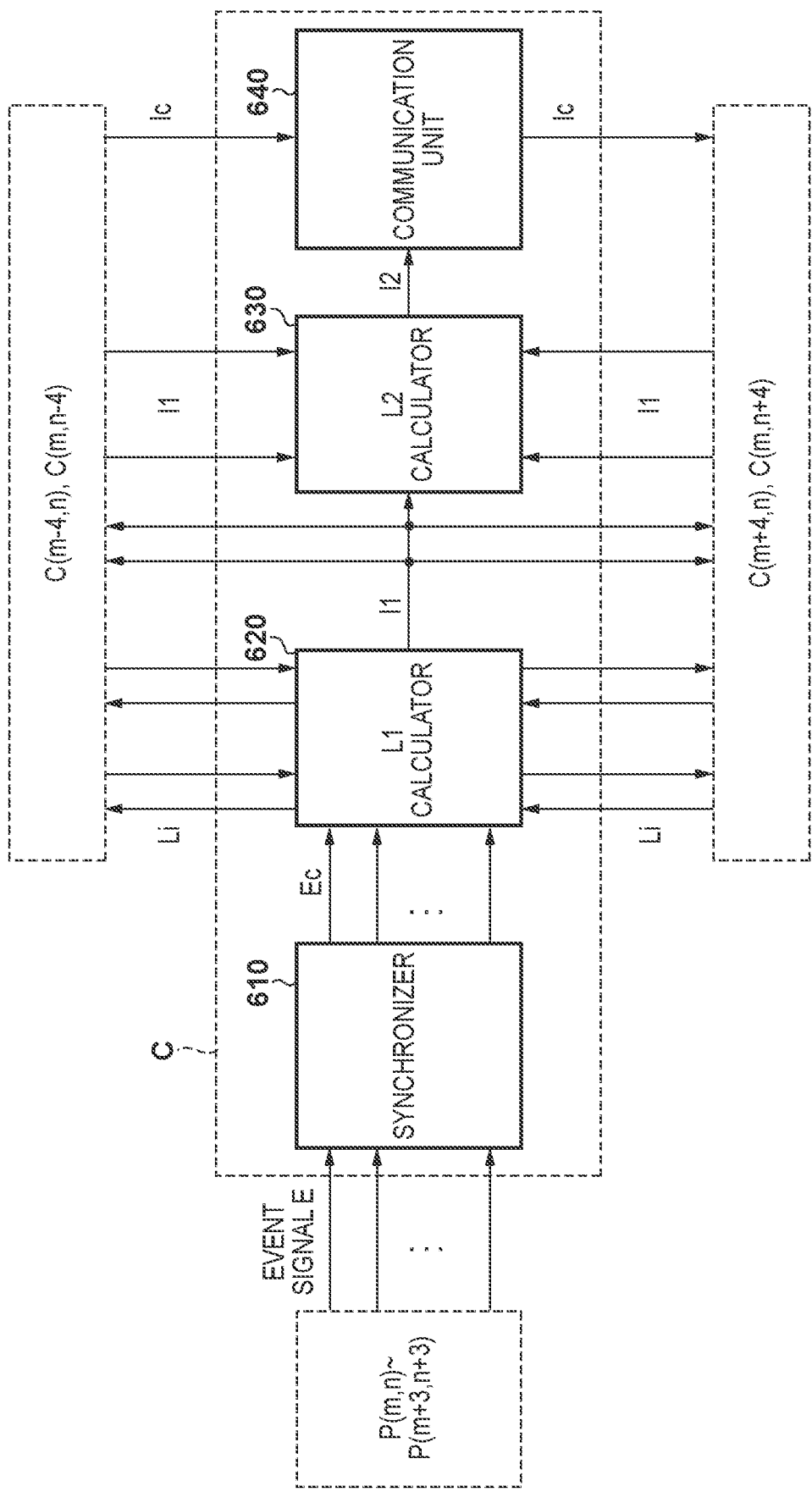
FIG. 6 is a view showing another arrangement example of the calculator of the photoelectric conversion device shown in FIG. 1.

FIG. 6 shows an arrangement example of the calculator C including an ANN. The event signal E input to the calculator C is, for example, input from the pixel P as shown in FIG. 3 described above. A synchronizer 610 counts the input event signals E for each predetermined period (for example, 1 ms). The synchronizer 610 sends, to an L1 calculator 620, a number Ec of the event signals E for each pixel P counted for each period (frame). The number Ec of the event signals E becomes image-like data (frame data) synchronized for each period in the photoelectric conversion device 10. Therefore, each of the L1 calculator 620 and an L2 calculator 630 can execute a general Convolutional ANN (CANN) operation. For example, the L1 calculator 620 executes a convolution operation, a Rectified Linear Unit (ReLU) operation, a pooling operation, and the like. Similarly, the L2 calculator 630 executes a convolution operation, a ReLU operation, a pooling operation, and the like. each of a calculation result I1 of the L1 calculator 620 and a calculation result I2 of the L2 calculator 630 also becomes image-like data for the same period as the number Ec of the event signals E. A communication unit 640 sequentially transmits a calculation result Ic as in the communication unit 330 described above, and the obtained feature amount data is output to the calculation device 20 via the processor 180 and the output IF unit 190.

Next, the arrangement of the pixels P and the calculators C will be described. FIG. 2 shows the arrangement in which one calculator C is arranged for every 4×4 pixels P. In this case, for example, for the single-layer structure in which the pixels P and the calculators C are arranged in one substrate, as compared to the pixel/calculator 120 in which the pixels P alone are arranged, it is necessary to increase the pitch for arranging the pixels P since the calculators C are also arranged. Even in a case in which the photodiode 210 serving as the photoelectric conversion element and the calculator C are arranged in different substrates, if the subtraction circuit 230 and the comparison circuit 240 are arranged in the substrate with the calculator C arranged therein, the arrangement of the pixels P and the calculators C can be the arrangement as shown in FIG. 2 in an orthographic projection with respect to the surface of the substrate. That is, it is necessary to increase the pitch for arranging the pixels P. Thus, this leads to a decrease in spatial resolution of the photoelectric conversion device 10.

Figure 7:
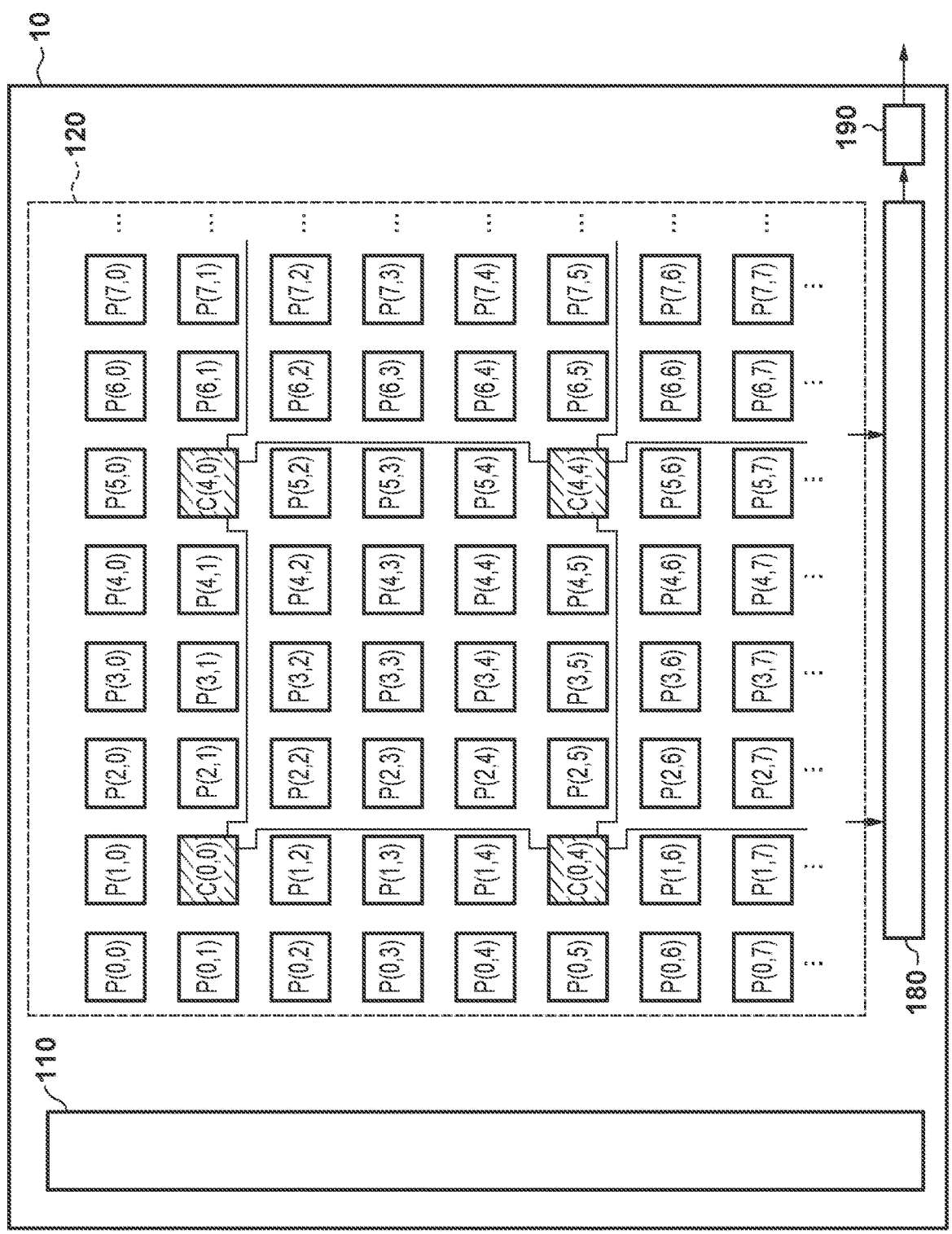
FIG. 7 is a view showing another arrangement example of the photoelectric conversion device shown in FIG. 1.

To solve this problem, for example, as shown in FIG. 7, in the pixel/calculator 120, pixels P may be thinned out at a predetermined interval from the plurality of pixels P arranged in a two-dimensional array, and each of the plurality of calculators C may be arranged in a region where the pixel P has been thinned out. If the photoelectric conversion device 10 has a stacked structure including a plurality of substrates, each of the plurality of calculators C may be arranged so as to overlap the region where the pixel has been thinned out. FIG. 7 shows an example in which one pixel is removed for every 16 pixels (4×4 pixels). More specifically, the pixel P(m+1, n+1) (each of m and n is a multiple of 4) is thinned out, and the calculator C is arranged in the region where the pixel P has been thinned out. Of 16 neighboring pixels, 15 pixels P excluding the thinned-out pixel are connected to each calculator C (connections are not shown). In each calculator C, four calculators C adjacent to each other are connected as in the arrangement shown in FIG. 2. Although 15 pixels P input signals to the calculator C, the feature amount can be extracted by the calculation similar to that described above. In the arrangement shown in FIG. 7, the interval for thinning out the pixel P matches the interval for arranging the calculator C. However, the present invention is not limited to this. For example, one pixel may be thinned out for every 32 pixels, and two calculators C may be arranged in the region where the pixel has been thinned out. Here, FIG. 7 also omits illustration of the control lines, shown in FIG. 2, used by the controller 110 to control the operations of the pixel/calculator 120 and the processor 180.

With the arrangement as described above, the influence on the arrangement pitch of the pixels P caused by arranging the calculators C in the pixel/calculator 120 is reduced. As a result, the photoelectric conversion device 10 achieves a high spatial resolution. By thinning out the pixels P, the information amount decreases. However, the information of the region where the calculator C is arranged can be complemented by the information obtained from the pixels P arranged around the calculator C. Hence, the influence on the final recognition performance is small.

Figure 8:
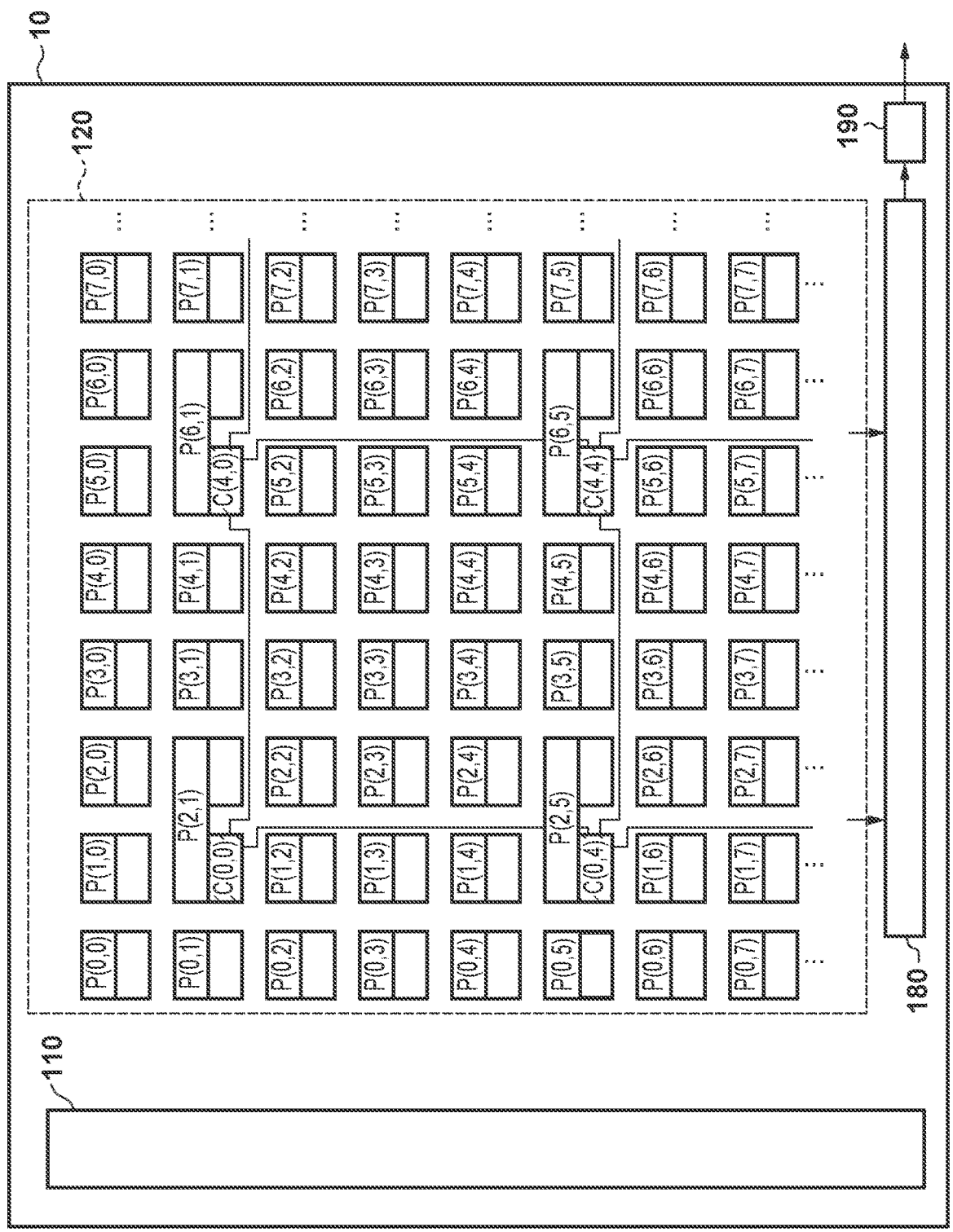
FIG. 8 is a view showing still another arrangement example of the photoelectric conversion device shown in FIG. 1.

FIG. 8 is a view for explaining a modification of the arrangement of the pixels P and the calculators C shown in FIG. 7. With the arrangement shown in FIG. 7, light entering the region where the calculator C is arranged may not be used for photoelectric conversion. The arrangement shown in FIG. 8 assumes a case in which the photoelectric conversion device 10 has a stacked structure including a plurality of substrates. For example, a case in which a substrate with the photodiode 210 serving as the photoelectric conversion element and a part of the logarithmic IN conversion circuit 220 arranged therein, and a substrate with the remaining part of the logarithmic I/V conversion circuit 220, the subtraction circuit 230, the comparison circuit 240, and the calculator C arranged therein are stacked is assumed. For each pixel P, the photodiode 210 and the part of the logarithmic I/V conversion circuit 220 can be arranged so as to overlap the remaining part of the logarithmic IN conversion circuit 220, the subtraction circuit 230, and the comparison circuit 240. On the other hand, a space can be generated in the region, which overlaps the calculator C, of the substrate with the photodiode 210 arranged therein. To prevent this, for example, as shown in FIG. 8, of the 4×4 pixels, the photoelectric conversion element of the pixel P(m+1, n+1) (each of m and n is a multiple of 4) extends up to the region overlapping the calculator C so that it can receive the incident light in the region for two pixels.

That is, the photoelectric conversion element (photodiode 210) arranged in each of the plurality of pixels P may include a photoelectric conversion element of a normal size, and a photoelectric conversion element larger than the photoelectric conversion element of the normal size. The plurality of pixels P are arranged such that a predetermined number of pixels each including the normal photoelectric conversion element are arranged between two pixels each including the large photoelectric conversion element. At this time, each of the plurality of calculators C is arranged so as to overlap the large photoelectric conversion element of the photoelectric conversion elements arranged in the plurality of pixels P. With this arrangement, the usage efficiency of light entering the pixel/calculator 120 of the photoelectric conversion device 10 can be improved.

If the same amount of light enters, the photocurrent $I_p$ generated in the pixel P(m+2, n+1) is about twice that generated in the other pixels P. However, when using the signal output from the pixel P(m+2, n+1) as the event signal E described above, the calculator C can handle the signal output from the pixel P including the large photoelectric conversion element equally to the signals output from other pixels P without any problem. Under low illuminance, the quality of the event signal E output from the pixel P(m+2, n+1) can be higher than that of the other pixels P. Therefore, under low illuminance, the calculator C may adjust the weighting on the event signal E output from the pixel P(m+2, n+1) to increase the contribution of the event signal E output from the pixel P(m+2, n+1) in the calculation result Sc.

Figure 10:
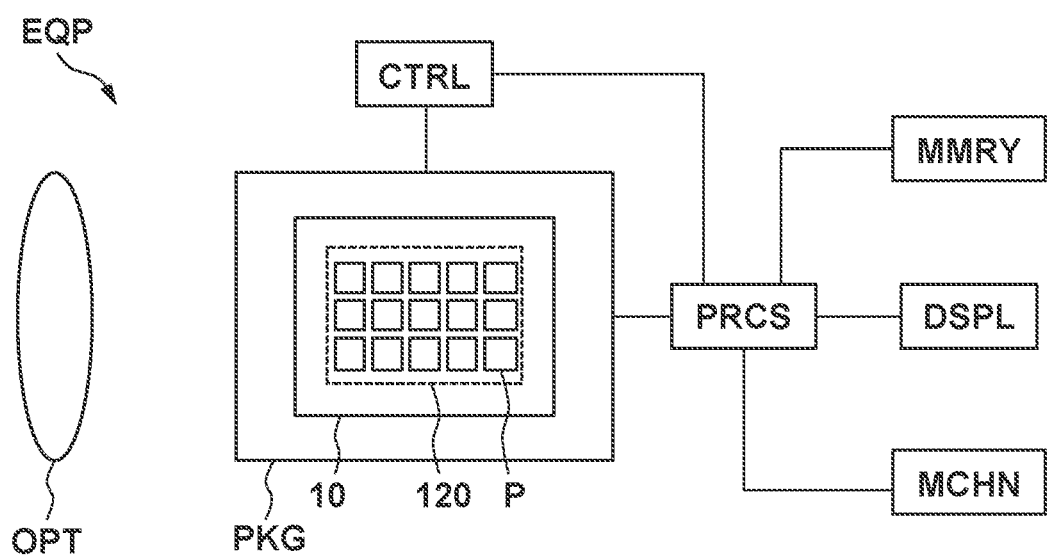
FIG. 10 is a view showing an arrangement example of equipment incorporating the photoelectric conversion device according to the embodiment.

As an application example of the photoelectric conversion device 10 (photoelectric conversion system SYS), equipment EQP including the photoelectric conversion device 10 (photoelectric conversion system SYS) shown in FIG. 10 will be described. The equipment EQP can also be called electronic equipment. FIG. 10 shows a camera as an example of the electronic equipment EQP. The concept of a camera here not only includes an apparatus whose main object is image capturing, but also an apparatus (for example, a personal computer or a mobile terminal such as a smartphone) that has an image capturing function auxiliary.

The photoelectric conversion device 10 can be a semiconductor chip with a stacked structure including the pixel/calculator 120. As shown in FIG. 10, the photoelectric conversion device 10 is contained in a semiconductor package PKG. The semiconductor package PKG can include a base to which the photoelectric conversion device 10 is fixed, a lid such as glass facing the photoelectric conversion device 10, and a conductive connecting member such as a bonding wire or bump used to connect the terminal arranged in the base to a terminal arranged in the photoelectric conversion device 10. The equipment EQP may further include at least one of an optical system OPT, a control device CTRL, a processing device PRCS, a display device DSPL, and a storage device MMRY.

The optical system OPT is a system for forming an image on the photoelectric conversion device 10, and can be, for example, a lens, a shutter, and a mirror. The control device CTRL is a device for controlling the operation of the photoelectric conversion device 10, and can be, for example, a semiconductor device such as an ASIC or the like. The processing device PRCS functions as a signal processing unit that processes the signal output from the photoelectric conversion device 10, and can be, for example, a semiconductor device such as a CPU, an ASIC, or the like. The display device DSPL can be an EL display device or a liquid crystal display device that displays image data obtained by the photoelectric conversion device 10. The storage device MMRY is a magnetic device or a semiconductor device for storing the image data obtained by the photoelectric conversion device 10. The storage device MMRY can be a volatile memory such as an SRAM, a DRAM, or the like or a nonvolatile memory such as a flash memory or a hard disk drive. A mechanical device MCHN includes a moving or propulsion unit such as a motor or an engine. The mechanical device MCHN in the camera can drive the components of the optical system OPT for zooming, focusing, and shutter operations. In the equipment EQP, image data output from the photoelectric conversion device 10 is displayed on the display device DSPL, or transmitted to an external device by a communication device (not shown) included in the equipment EQP. Hence, the equipment EQP may also include the storage device MMRY and the processing device PRCS.

The camera incorporating the photoelectric conversion device 10 is also applicable as a surveillance camera or an onboard camera mounted in transportation equipment such as an automobile, a railroad car, a ship, an airplane, or an industrial robot. In addition, the camera incorporating the photoelectric conversion device 10 is not limited to transportation equipment but is also applicable to equipment that widely uses object recognition, such as an intelligent transportation system (ITS).

Figure 11A:
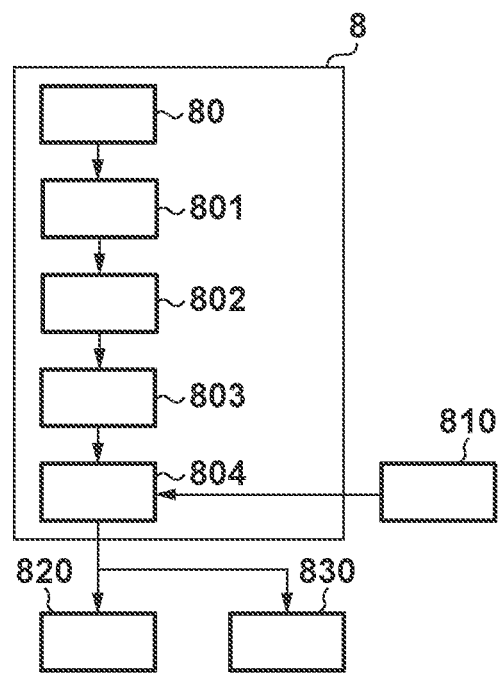
FIGS. 11A and 11B are views showing an arrangement example of a moving body incorporating the photoelectric conversion device according to the embodiment.
Figure 11B:
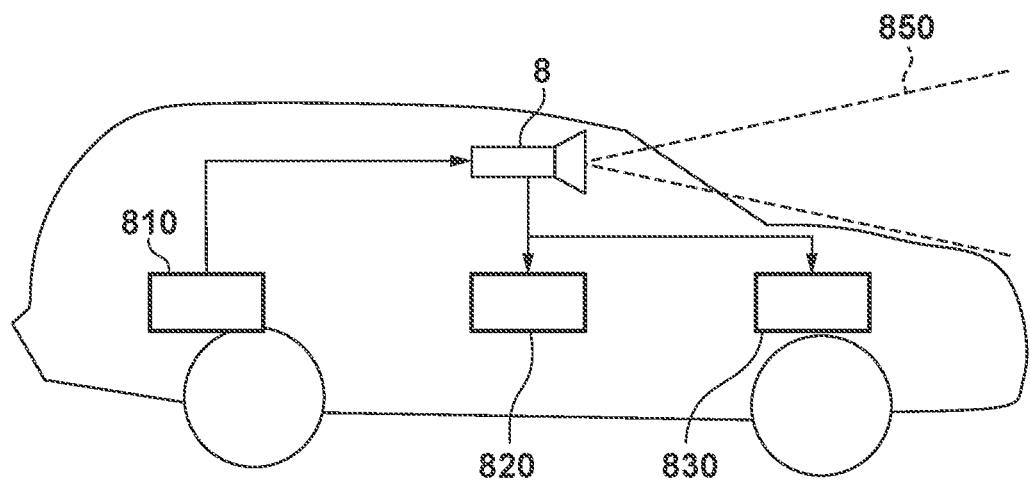

A specific application of incorporating, in a moving body, the photoelectric conversion device 10 (photoelectric conversion system SYS) of this embodiment will be described next with reference to FIGS. 11A and 11B. FIG. 11A shows an example of a photoelectric conversion system concerning an in-vehicle camera. A photoelectric conversion system 8 includes a photoelectric conversion device 80. The photoelectric conversion device 80 is the photoelectric conversion device 10 (photoelectric conversion system SYS) described in the above-described embodiment. The photoelectric conversion system 8 includes an image processor 801 that performs signal processing for a plurality of image data acquired by the photoelectric conversion device 80, and a parallax acquirer 802 that calculates a parallax (the phase difference between parallax images) from the plurality of image data acquired by the photoelectric conversion system 8. The photoelectric conversion system 8 also includes a distance acquirer 803 that calculates the distance up to a target object based on the calculated parallax, and a collision determiner 804 that determines, based on the calculated distance, whether there is collision possibility. Here, the parallax acquirer 802 and the distance acquirer 803 are examples of a distance information acquisition unit that acquires distance information up to a target object. That is, the distance information is information concerning a parallax, a defocus amount, a distance up to a target object, and the like. The collision determiner 804 may determine collision possibility using one of the pieces of distance information. The distance information acquisition unit may be implemented by exclusively designed hardware, or may be implemented by a software module. The distance information acquirer may be implemented by a Field Programmable Gate Array (FPGA) or an Application Specific Integrated Circuit (ASIC), or may be implemented by a combination of these.

The photoelectric conversion system 8 is connected to a vehicle information acquisition device 810, and can acquire vehicle information such as a vehicle speed, a yaw rate, and a steering angle. The photoelectric conversion system 8 is also connected to a control ECU 820 that is a control device configured to output a control signal for generating a braking force to the vehicle based on the determination result of the collision determiner 804. Furthermore, the photoelectric conversion system 8 is connected to an alarming device 830 that generates an alarm to the driver based on the determination result of the collision determiner 804. For example, if collision possibility is high as the determination result of the collision determiner 804, the control ECU 820 performs vehicle control of braking, releasing the accelerator pedal, or suppressing the engine output, thereby avoiding collision and reducing damage. The alarming device 830 sounds an alarm, displays alarming information on the screen of a car navigation system or the like, or applies a vibration to the seat belt or a steering wheel, thereby making an alarm to the user.

In this embodiment, the periphery of the vehicle, for example, the front or rear side is captured by the photoelectric conversion system 8. FIG. 11B shows the photoelectric conversion system in a case in which the front side (image capturing range 850) of the vehicle is captured. The vehicle information acquisition device 810 sends an instruction to the photoelectric conversion system 8 or the photoelectric conversion device 80. With this configuration, it is possible to further improve the accuracy of distance measurement.

An example of control of avoiding a collision with another vehicle has been described. However, the present invention is not limited to this, and the system can also be applied to control of performing automated driving following another vehicle or control of performing automated driving without deviating from a lane.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-145573, filed Sep. 13, 2022, which is hereby incorporated by reference herein in its entirety.

What is claimed is:

1. A photoelectric conversion device that comprises a plurality of pixels each including a photoelectric conversion element, a plurality of calculators, and a processor, wherein
the plurality of pixels and the plurality of calculators are respectively arranged in a two-dimensional array,
for the plurality of pixels, each pixel group of pixel groups composed of not less than two pixels of the plurality of pixels is connected to a corresponding calculator of the plurality of calculators,
each pixel group is configured to output a spiking signal generated by a pixel in a pixel group of the pixel groups to the corresponding calculator of the plurality of calculators,
each of the plurality of calculators is configured to execute calculation for the spiking signal,
the processor is configured to process a calculation result input from each of the plurality of calculators,
each of the plurality of pixels is configured to output the spiking signal in accordance with a change of a signal output from the photoelectric conversion element, and
each of the plurality of pixels comprises a subtraction circuit configured to acquire a subtraction value obtained by subtracting a reference value from a signal value of a signal output from the photoelectric conversion element, and a comparison circuit configured to compare the subtraction value with a predetermined threshold value.

2. The device according to claim 1, wherein
each of the plurality of calculators comprises a neural network.

3. The device according to claim 2, wherein
each of the plurality of calculators is configured to execute calculation based on a membrane potential corresponding to the received spiking signal.

4. The device according to claim 1, wherein
each of the plurality of pixels is configured to output the spiking signal at a frequency corresponding to a signal value of a signal output from the photoelectric conversion element.

5. The device according to claim 1, wherein
the photoelectric conversion element comprises an avalanche photodiode.

6. The device according to claim 1, wherein
pixels are thinned out at a predetermined interval from the plurality of pixels arranged in a two-dimensional array, and
each of the plurality of calculators is arranged in a region where the pixel has been thinned out.

7. The device according to claim 1, wherein
a first semiconductor layer, in which at least the photoelectric conversion elements of the plurality of pixels are arranged, and a second semiconductor layer, in which the plurality of calculators are arranged, are stacked.

8. The device according to claim 7, wherein
an insulating film and a connection portion, which is provided in the insulating film and made of a metal, are provided in a bonding surface of each of a first substrate including the first semiconductor layer and a second substrate including the second semiconductor layer, and
the first substrate and the second substrate are bonded by bonding the insulating film of the first substrate to the insulating film of the second substrate, and bonding the connection portion of the first substrate to the connection portion of the second substrate.

9. The device according to claim 7, wherein
pixels are thinned out at a predetermined interval from the plurality of pixels arranged in a two-dimensional array, and
each of the plurality of calculators is arranged so as to overlap a region where the pixel has been thinned out.

10. The device according to claim 7, wherein
the plurality of pixels comprise pixels including a first photoelectric conversion element as the photoelectric conversion element and pixels including a second photoelectric conversion element larger than the first photoelectric conversion element as the photoelectric conversion element,
the plurality of pixels are arranged such that a predetermined number of pixels each including the first photoelectric conversion element are arranged between two pixels each including the second photoelectric conversion element, and
each of the plurality of calculators is arranged so as to overlap the second photoelectric conversion element of the photoelectric conversion elements arranged in the plurality of pixels.

11. A photoelectric conversion system that comprises the photoelectric conversion device according to claim 1, and
a calculation device,
wherein the calculation device is configured to perform a recognition process based on a signal output from the photoelectric conversion device.

12. Equipment comprising:
the photoelectric conversion device according to claim 1; and
a processing device configured to process a signal output from the photoelectric conversion device.

13. A moving body that comprises the photoelectric conversion device according to claim 1, including
a control device configured to control movement of the moving body using a signal output by the photoelectric conversion device.

14. A photoelectric conversion device that comprises a plurality of pixels each including a photoelectric conversion element, and a plurality of calculators, wherein
the plurality of pixels and the plurality of calculators are respectively arranged in a two-dimensional array,
for the plurality of pixels, each pixel group of pixel groups composed of not less than two pixels of the plurality of pixels is connected to a corresponding calculator of the plurality of calculators,
each pixel group is configured to output a spiking signal generated by a pixel in a pixel group of the pixel groups to the corresponding calculator of the plurality of calculators in accordance with a change of a signal output from the photoelectric conversion element, each of the plurality of calculators is configured to execute calculation for the spiking signal, and each of the plurality of pixels comprises a subtraction circuit configured to acquire a subtraction value obtained by subtracting a reference value from a signal value of a signal output from the photoelectric conversion element, and a comparison circuit configured to compare the subtraction value with a predetermined threshold value.

15. A photoelectric conversion device that comprises a plurality of pixels each including a photoelectric conversion element, a plurality of calculators, and a processor, wherein the plurality of pixels and the plurality of calculators are respectively arranged in a two-dimensional array, for the plurality of pixels, each pixel group of pixel groups composed of not less than two pixels of the plurality of pixels is connected to a corresponding calculator of the plurality of calculators, each pixel group is configured to output a spiking signal generated by a pixel in a pixel group of the pixel groups to the corresponding calculator of the plurality of calculators, each of the plurality of calculators is configured to execute calculation for the spiking signal, the processor is configured to process a calculation result input from each of the plurality of calculators, a first semiconductor layer, in which at least the photoelectric conversion elements of the plurality of pixels are arranged, and a second semiconductor layer, in which the plurality of calculators are arranged, are stacked, the plurality of pixels comprise pixels including a first photoelectric conversion element as the photoelectric conversion element and pixels including a second photoelectric conversion element larger than the first photoelectric conversion element as the photoelectric conversion element, the plurality of pixels are arranged such that a predetermined number of pixels each including the first photoelectric conversion element are arranged between two pixels each including the second photoelectric conversion element, and each of the plurality of calculators is arranged so as to overlap the second photoelectric conversion element of the photoelectric conversion elements arranged in the plurality of pixels.

16. The device according to claim 15, wherein each of the plurality of pixels is configured to output the spiking signal in accordance with a change of a signal output from the photoelectric conversion element.

17. The device according to claim 16, wherein each of the plurality of pixels comprises a subtraction circuit configured to acquire a subtraction value obtained by subtracting a reference value from a signal value of a signal output from the photoelectric conversion element, and a comparison circuit configured to compare the subtraction value with a predetermined threshold value.

* * * * *